United States Patent
Yagi et al.

(10) Patent No.: US 6,227,519 B1
(45) Date of Patent: *May 8, 2001

(54) FEMALE MOLD SUBSTRATE HAVING A HEAT FLOWABLE LAYER, METHOD TO MAKE THE SAME, AND METHOD TO MAKE A MICROPROBE TIP USING THE FEMALE SUBSTRATE

(75) Inventors: Takayuki Yagi, Yokohama; Tsutomu Ikeda, Hachiohji; Yasuhiro Shimada, Hadano, all of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,290

(22) Filed: Apr. 29, 1998

(30) Foreign Application Priority Data

May 7, 1997 (JP) ................................................. 9-132882

(51) Int. Cl.[7] .................................................... B29C 33/38

(52) U.S. Cl. .............................. 249/114.1; 216/2; 216/39

(58) Field of Search ........................... 249/114.1; 216/2, 216/39

(56) References Cited

U.S. PATENT DOCUMENTS

| | | | |
|---|---|---|---|
| 4,782,037 | * 11/1988 | Tomazawa et al. | 437/192 |
| 5,091,330 | * 2/1992 | Cambou et al. | 437/62 |
| 5,221,415 | 6/1993 | Albrecht et al. | 156/629 |
| 5,535,980 | * 7/1996 | Baumgartner et al. | 249/114.1 |
| 5,599,749 | * 2/1997 | Hattori | 437/228 |
| 5,660,680 | * 8/1997 | Keller | 438/50 |

FOREIGN PATENT DOCUMENTS 6-084455    3/1994   (JP).

OTHER PUBLICATIONS

Spindt, et al.; "Physical . . . cones", J. Appl. Phys. 47, 12, Dec. 1976, p. 5248–5263.

Binning et al.; "Surface . . . Microscopy", Phys Rev. Ltrs. 49, 1, Jul. 1982, 57–61.

Ehrichs, et al.,; "Etching of Silicon . . . ", J. Vac. Sci. Techn., A8 (1) 1990, 571–173.

Wolter, et al.; "Micromachined . . . microscopy" J. Vac. Sci. Techn., B9 (2) 1991, 1353–1357.

Akamine, et al.; "Low temperature . . . tips", J. Vac. Sci. Techn., B10 (5) 1992, 2307–2310.

* cited by examiner

Primary Examiner—James P. Mackey
(74) Attorney, Agent, or Firm—Fitzpatrick, Cella, Harper & Scinto

(57) ABSTRACT

A female mold substrate used for the production of a microprobe tip or probe detecting a tunneling current or weak force includes a substrate provided with a recess section and a heat-flowable layer having flowability by heat treatment formed on the substrate and covering the recess. The female mold substrate is made by forming a recess section on the top surface of a substrate and forming a heat-flowable layer on the top surface of the substrate including the recess section. A microprobe tip detecting a tunneling current or weak force is made by forming a tip material layer on the female mold substrate and transferring the tip of material layer onto another substrate.

11 Claims, 6 Drawing Sheets

FEMALE MOLD SUBSTRATE HAVING A HEAT FLOWABLE LAYER, METHOD TO MAKE THE SAME, AND METHOD TO MAKE A MICROPROBE TIP USING THE FEMALE SUBSTRATE

BACKGROUND OF THE INVENTION

1. Field of the Invention

The present invention relates to a female substrate used in the production of microprobe tips for scanning tunneling microscopes and atomic force microscopes for detecting significantly weak forces. The present invention also relates to a method for making the female substrate. Further, the present invention relates to methods for making a microprobe tip and a probe using the female substrate. In particular, the present invention relates to a female substrate used in the production of microprobe tips and a method for making the same, in which microprobe tips having substantially the same curvature radius and being suitable for use in the above-mentioned microscopes can be produced on the same or different substrates with a high mass production efficiency.

2. Description of the Related Art

Since the development of a scanning tunneling microscope (hereinafter referred to as "STM") (G. Binning et al., *Phys. Re. Lett.*, 49, 57 (1983)), direct observation of real spatial images on the electronic structure of atoms at the surface of a conductor has been achieved at a high resolution regardless of whether it is a single-crystal or amorphous material. The STM detects a tunnel current that occurs between a metal tip and the conductive material being observed when the conductive material approaches the tip at a distance of approximately 1 nm. The current changes exponentially with the distance between them. When the tip is scanned on the conductive material so that the tunnel current has a constant value, the surface structure of the real space can be observed with a resolution at the atomic level. Although STMs have formerly been used for analysis of only conductive materials, they have also been used recently for structural analysis of thin insulating layers formed on the surfaces of conductive materials.

The STM can detect a microcurrent flow, hence a medium can be observed with a low amount of electric power without damage to the medium. Since the STM can work in the atmosphere, it has been applied to various fields, for example, observation at the atomic or molecular level of semiconductors and polymers, micro-fabrication process (E. E. Ehrichs, "Proceedings of the 4th International Conference on Scanning Tunneling Microscopy/Spectroscopy", 89, S13-3), and information recording/regenerating devices. Simultaneous drive of many probes, that is, the use of multiple tips is proposed for application of the STM to information recording/regenerating devices, hence production of a plurality of tips having substantially the same curvature radius on a substrate is required. The atomic force microscope (hereinafter referred to as "AFM") detects a repulsive force or attractive force working between the tip and the surface of a material, and permits observation of a topographical image of the surface whenever the material is a conductor or insulator. The AFM uses a thin film cantilever provided with a microprobe tip at the free end of the cantilever. Also, in AFM measurement, microprobe tips having the same curvature radius must always be used in order to secure high reproducibility.

A typical method for making such microprobe tips is disclosed in U.S. Pat. No. 5,221,415, in which a microprobe tip is formed by anisotropic etching of single-crystal silicon by means of a semiconductor fabrication process. As shown in FIG. 1, a pit 518 as a female mold for a microprobe tip is formed on a silicon wafer 514 covered with silicon dioxide masks 510 and 512 by an anisotropic etching process, and the silicon dioxide masks 510 and 512 are removed. Both surfaces of the silicon wafer 514 are covered with silicon nitride layers 520 and 521. The upper silicon nitride layer 520 has a pyramidal pit 522. After the upper silicon nitride layer 520 is patterned to form a cantilever, the silicon nitride layer 521 on the bottom surface is removed. A glass plate 530 provided with a sawcut 534 and a chromium layer 532 is bonded to the upper silicon nitride layer 520, and the silicon wafer 514 is removed by etching. As a result, a probe consisting of a microprobe tip and a cantilever, which are composed of silicon nitride, is formed on a mounting block 540. Finally, a metal film 542 as a reflection film for an optical lever-type AFM is formed on the bottom surface. In this method, the curvature radius of the silicon nitride tip can be controlled by forming a silicon dioxide film by thermal oxidation on the pit as the female mold after removal of the silicon dioxide masks 510 and 512 (S. Akamine and C. F. Quate, "Low temperature thermal oxidation sharpening of microcast tips", *J. Vac. Sci. Technol.* B10(5), September/October, p. 2307 (1992)).

In another method for tip production, as shown in FIG. 2A, a tip 613 is formed by side etching of a silicon substrate 611 using a disk-shape mask 612 provided on the silicon substrate 611 (O. Wolter, et. al., "Micromachined silicon sensors for scanning force microscopy", *J. Vac. Sci. Technol.*, B9(2), March/April, pp. 1353–1357 (1991)). Alternatively, as shown in FIG. 2B, a tip 623 is also formed by evaporating a conductive material 625 placed on a resist 622 in the orthogonal directions and depositing it onto a rotating substrate 621 through a resist opening 624 (C. A. Spindt, et. al., "Physical properties of thin film field emission cathode with molybdenum cones", *J. Appl. Phys.*, 47, pp. 5248–5263 (1976)).

Although the conventional method shown in FIG. 1 permits the production of microprobe tips with high reproducibility, the controllable curvature radius of the tips is limited to a narrow range from 10 nm to 40 nm.

In the methods shown in FIGS. 2A and 2B, although tips having various curvature radii can be produced, severe process control is required in order to maintain constant conditions for silicon etching, resist patterning and evaporation of the conductive material. It is difficult to produce a plurality of tips with high reproducibility of height and curvature radius.

SUMMARY OF THE INVENTION

Accordingly, it is an object of the present invention to provide a female mold substrate which permits production of microprobe tips having a wide range of curvature radii with high reproducibility.

It is another object of the present invention to provide a method for making the female mold substrate.

It is a further object of the present invention to provide a method for producing a microprobe tip and a probe using the female mold substrate.

The above-mentioned objects are achieved by a female mold substrate used for the production of a microprobe tip or probe detecting a tunneling current or weak force, including a substrate provided with a recess section and a heat-flowable layer having flowability by heat treatment formed on the substrate.

The above-mentioned objects are also achieved by a method for making a female mold substrate used for the production of a microprobe tip or probe detecting a tunneling current or weak force, including the steps of forming a recess section on the top surface of a substrate and forming a heat-flowable layer having flowability by heat treatment on the top surface of the substrate including the recess section.

The above-mentioned objects are further achieved by a method for making a microprobe tip detecting a tunneling current or weak force, including the steps of forming a tip material layer on a female mold substrate and transferring the tip material layer onto another substrate.

The above-mentioned objects are further achieved by a method for making a probe detecting a tunneling current or weak force, including the steps of forming a probe material layer on a female mold substrate and transferring the probe material layer onto another substrate.

DESCRIPTION OF THE PREFERRED EMBODIMENT

Figure 1A:
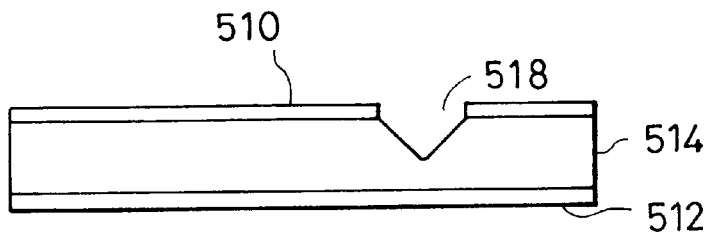
FIGS. 1A–1G include cross-sectional views illustrating main steps in a conventional method for making a microprobe tip.
Figure 1B:
Figure 1C:
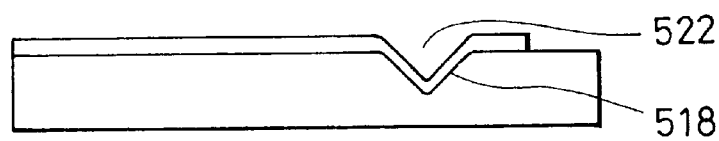
Figure 1D:
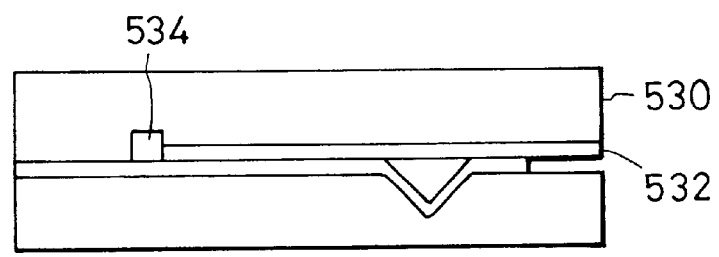
Figure 1E:
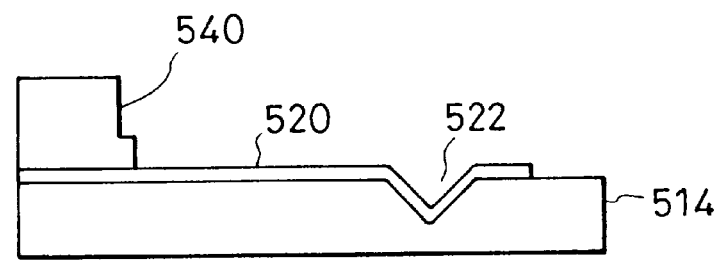
Figure 1F:
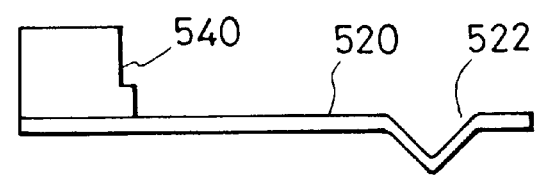
Figure 1G:
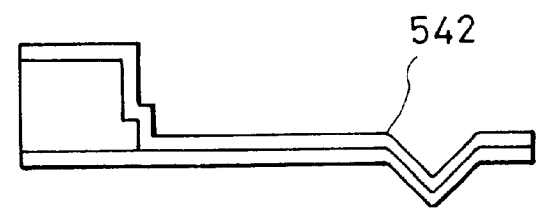
Figure 2A:
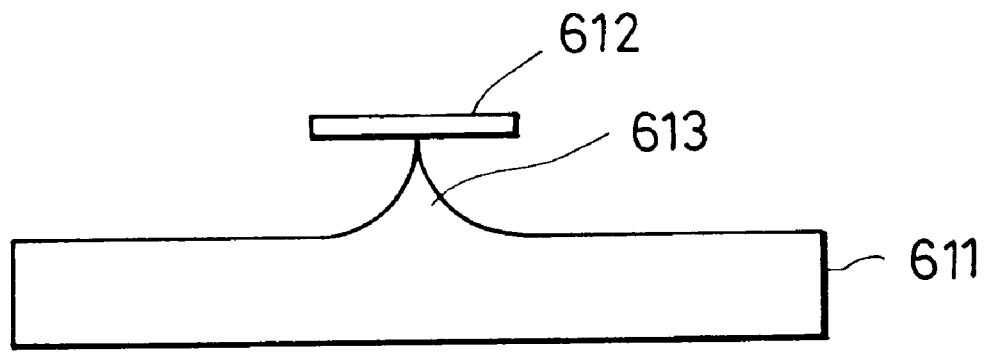
FIGS. 2A and 2B are cross-sectional views illustrating conventional processes for making microprobe tips.
Figure 2B:
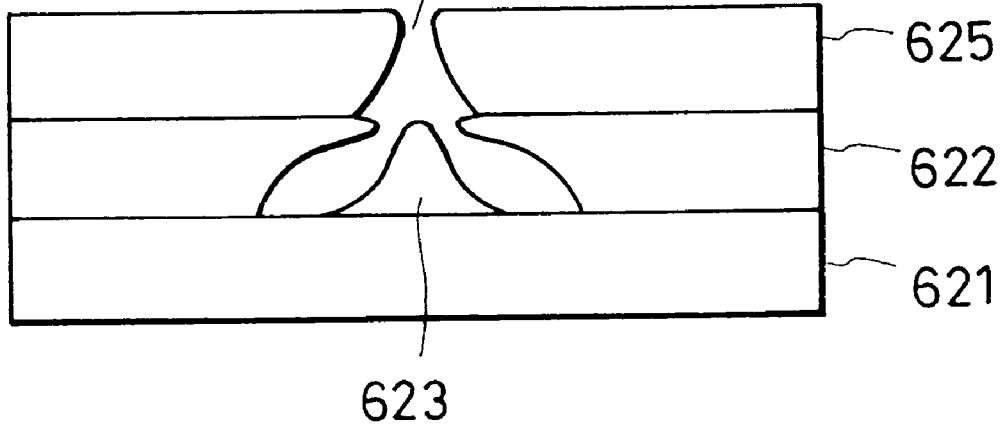

The female mold substrate used for the production of a microprobe tip or probe in accordance with the present invention includes a substrate provided with a recess section and a heat-flowable layer having flowability by heat treatment formed on the substrate. A tip material layer is formed on the female mold substrate and bonded to another substrate. A microprobe tip is formed by separating the female mold substrate or removing it by etching. By repeating the process, a plurality of tips having a protrusion corresponding to the recess section of the female mold substrate can be produced with high reproducibility.

When the heat-flowable layer is deformed and flows by heat, the thickness of the heat-flowable layer on the female mold substrate increases at the bottom of the recess section by the surface tension and the bottom corner is rounded. A tip formed using such a female mold substrate has a protrusion with a large curvature radius.

A single-crystal silicon substrate is preferably used as the female mold substrate in accordance with the present invention. A pyramidal recess section terminated by intersecting (111) crystal planes is formed by anisotropic etching along the crystal axis. The pyramidal recess section has a sharp edge. When a plurality of pyramidal recess sections are formed on the same substrate, they have substantially the same shape. Accordingly, the anisotropic etching has high reproducibility of the shape. Alternatively, a silicon substrate, in which the edge is sharpened by silicon dioxide, may be used as the female mold substrate (S. Akamine and C. F. Quate, "Low temperature thermal oxidation sharpening of microcast tips", J. Vac. Sci. Technol. B10(5), September/October, 1992, p2307). The use of such a female mold substrate is capable of producing a microprobe tip having a high aspect ratio and of controlling the curvature radius, wherein the aspect ratio is defined by the ratio of the width to the height of the pyramidal protrusion.

Preferable materials for the heat-flowable layer flows by heat treatment and have thermoplasticity. The temperature for the heat treatment must be sufficiently lower than the melting temperature of the female mold substrate. Preferably, the temperature for the heat treatment is higher than the temperature when the microprobe tip is formed in order to achieve satisfactory flow.

A preferable heat-flowable material is a glass material which flows without crystallization by the heat treatment and which is not reactive with the tip material. A glass layer formed by chemical vapor deposition (CVD) of a gaseous organic silicone, e.g. tetraethyl orthosilicate (TEOS) or diethylsilane, is preferable, since it can be formed at a relatively low temperature with high reproducibility and has a uniform thickness.

Phosphosilicate glass (PSG), boro-silicate glass (BSG), and borophosphosilicate glass (BPSG) formed of a mixture of the above-mentioned material gas and at least one dopant, such as trimethyl phosphate (TMP) and trimethyl borate (TMB), can also be used. In particular, PSG is preferred as the heat-flowable material since the PSG film can be formed at a temperature of less than 400° C.

The heat-flowable layer may be formed by a conventional process, such as a vacuum evaporation process, a sputtering process, a chemical vapor deposition process, a spin coating process, or a dipping process, which can exactly replicate the recess section formed on the substrate.

The female mold substrate in accordance with the present invention is applicable to the method for forming a microprobe tip disclosed in U.S. Pat. No. 5,221,415, and the method disclosed in Japanese Patent Laid-Open No. 6-084455, in which a microprobe tip material layer is formed on a female mold substrate, bonded to another substrate and detached from the female mold substrate.

Embodiments in accordance with the present invention will now be described.

[Embodiment 1]

Figure 3A:
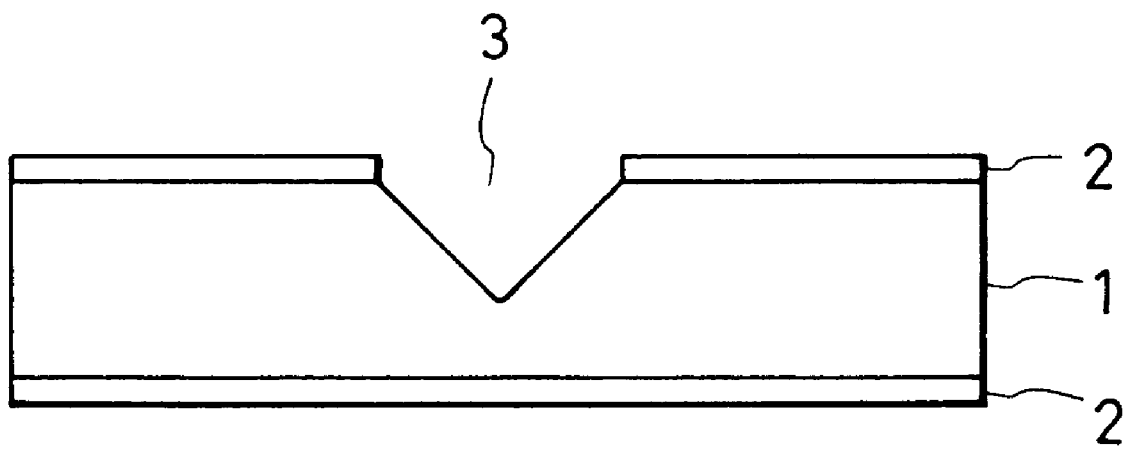
FIGS. 3A–3C include cross-sectional views illustrating production steps of a female mold substrate in accordance with Embodiment 1 of the present invention.
Figure 3B:
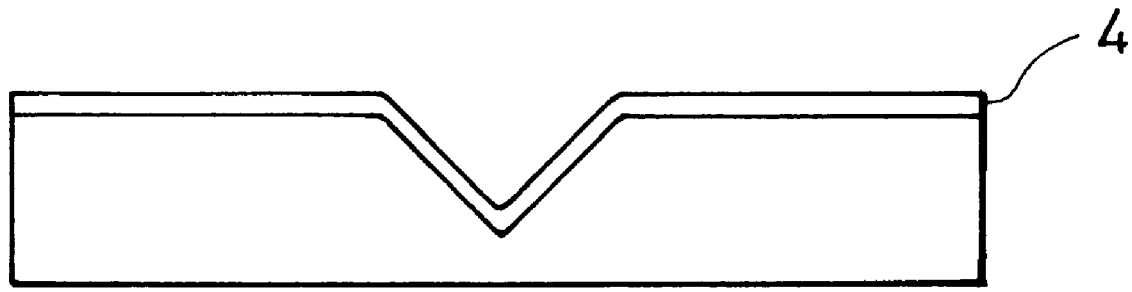
Figure 3C:
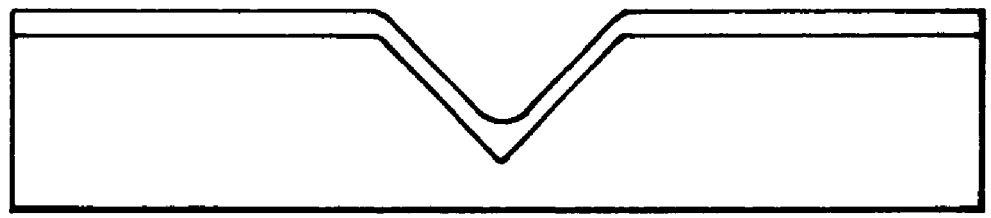

FIGS. 3A–3C include cross-sectional views illustrating production steps of a female mold substrate in accordance with Embodiment 1 of the present invention. FIGS. 4A–4E include cross-sectional views illustrating production steps of an AFM probe comprising a silicon nitride tip and a cantilever using the female mold substrate.

In FIG. 3A, a silicon wafer having a crystal orientation of <100> was prepared as a substrate 1. The substrate 1 was provided with silicon dioxide protective layers 2 formed on both surfaces by thermal oxidation with an oxidizing gas. A predetermined position of the upper protective layer 2 was etched with an aqueous HF solution using a photoresist mask formed by a photolithographic process to expose a silicon square with a side of 8 μm. The protective layer 2 was resistant to the etching solution and protected the substrate 1 during the crystal-axis anisotropic etching process. After the photoresist mask was removed, the substrate 1 was subjected to crystal-axis anisotropic etching in an aqueous 27% potassium hydroxide solution at 80° C. to form an inverted pyramidal recess section 3 terminated by intersecting (111) crystal planes and a depth of 5.6 μm (FIG. 3A).

After the protective layers 2 were removed with an aqueous HF etching solution, a heat-flowable layer composed of PSG was formed. PSG has sufficient heat resistance at a temperature for forming a silicon nitride layer. The PSG heat-flowable layer 4 with a thickness of 100 nm was formed on the substrate 1 provided with the recess section 3 by a CVD process at 350° C. using TEOS, TMP and ozone (FIG. 3B). The substrate was subjected to heat treatment at 1,100° C. for 20 minutes as shown in FIG. 3C, so that the thickness of the heat-flowable layer 4 at the bottom of the recess section was larger than that without heat treatment. The female mold substrate in accordance with the present invention was formed in such a manner.

Next, a silicon nitride AFM probe was formed using the female mold substrate. The process for forming the AFM probe was substantially the same as the conventional process shown in FIG. 1, except for the use of the female mold substrate in accordance with the present invention instead of the conventional female mold substrate. The process will now be described in detail with reference to FIG. 4.

Figure 4A:
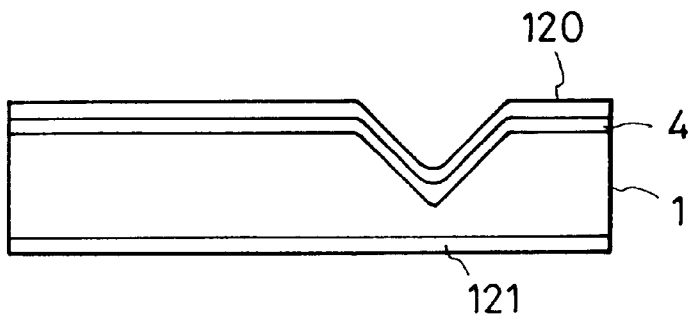
FIGS. 4A–4E include cross-sectional views illustrating production steps of an AFM probe using the female mold substrate in accordance with Embodiment 1 of the present invention.
Figure 4B:
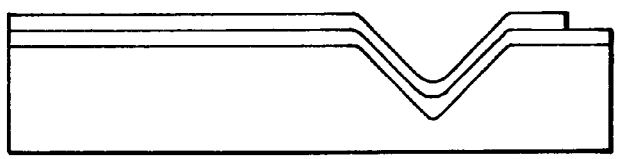
Figure 4C:
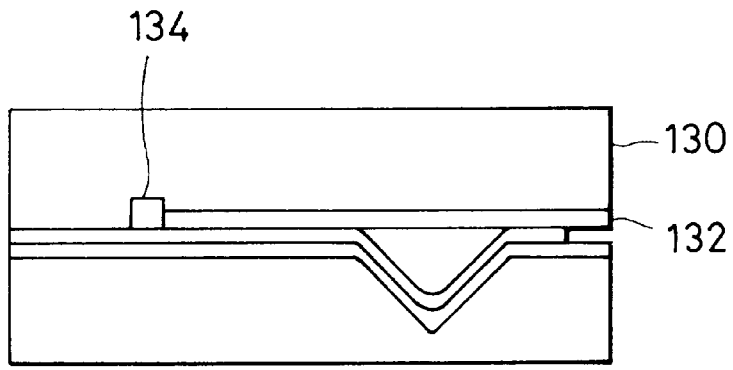
Figure 4D:
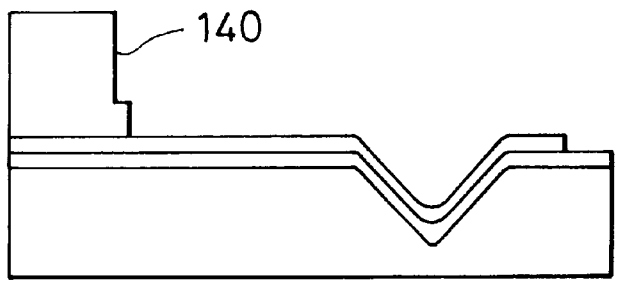
Figure 4E:
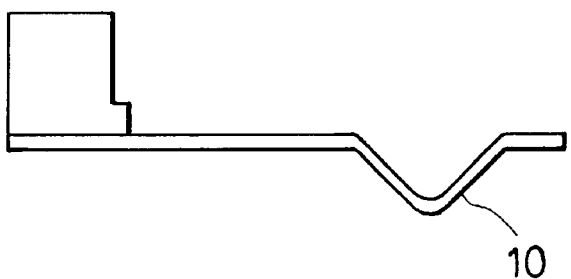

As shown in FIG. 4A, silicon nitride films 120 and 121 with a thickness of 0.5 μm were formed on the both surfaces of the substrate by a low pressure CVD process under the conditions of a temperature of 848° C., a flow rate ratio of $NH_3$: $SiH_2Cl_2$=10 ccm:20 ccm, and a pressure of 0.2 Torr. A photoresist layer with a cantilever pattern was formed on the silicon nitride film 120 by a photolithographic process, the silicon nitride layer was patterned to form a thin film cantilever by a reactive ion etching process using $CF_4$, and the photoresist layer was removed (FIG. 4B). The silicon nitride layer 120 was bonded to a glass plate 130 having a sawcut 134 and a chromium layer 132, the glass plate was vertically cut at the position of the sawcut 134, and the right portion of the glass plate 130 with the chromium layer 132, which was not bonded to the silicon nitride film 120, was removed to form a mounting block 140 (FIG. 4D). The substrate 1 was removed with an aqueous KOH etching solution and then the heat-flowable layer was removed with an aqueous HF etching solution. A silicon nitride probe comprising the microprobe tip, the cantilever and the mounting block 140 was formed on the substrate 1.

The point of the silicon nitride tip 10 was observed by a scanning electron microscope (SEM). The tip had a replicated shape of the inverted pyramid of the substrate and a tip radius of 100 nm. The point of the microprobe tip formed by the conventional process shown in FIG. 1 was observed by a SEM for comparison. The tip had a tip radius of 40 nm. A microprobe tip with a larger radius can be produced using the female mold substrate in accordance with the present invention. Since, the process for forming the heat-flowable layer and treating it with heat in the method for making the female mold substrate in accordance with the present invention is based on the technology for producing semiconductor integrated circuits, the process had high reproducibility.

[Embodiment 2]

Figure 5A:
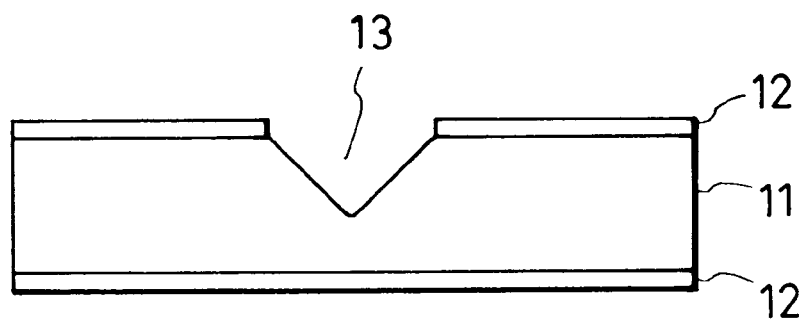
FIGS. 5A–5D include cross-sectional views illustrating production steps of a female mold substrate in accordance with Embodiment 2 of the present invention.
Figure 5B:
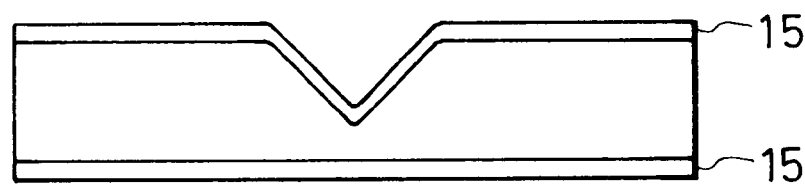
Figure 5C:
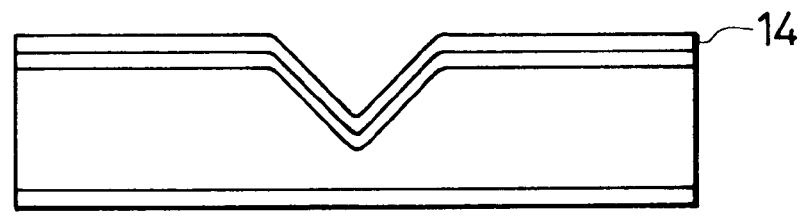
Figure 5D:
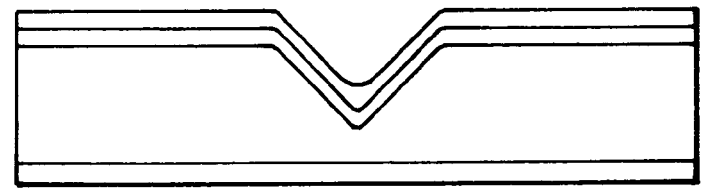
Figure 6A:
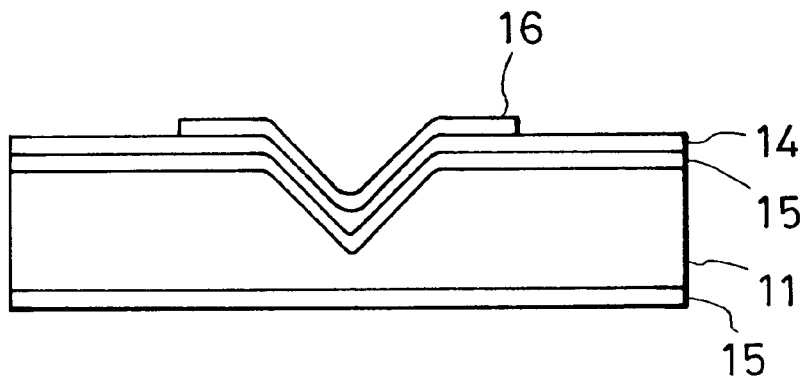
FIGS. 6A–6C include cross-sectional views illustrating production steps of a microprobe tip using the female mold substrate in accordance with Embodiment 2 of the present invention.
Figure 6B:
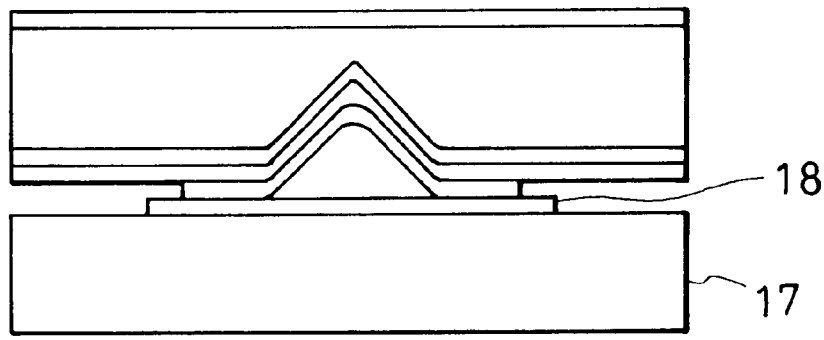
Figure 6C:
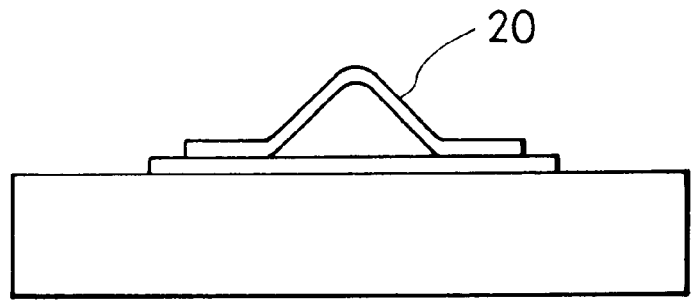

FIGS. 5A–5D include cross-sectional views illustrating production steps of a female mold substrate in accordance with Embodiment 2 of the present invention, and FIGS. 6A–6C include cross-sectional views illustrating production steps of a microprobe tip using the female mold substrate. In FIG. 5A, a silicon wafer having a crystal orientation of <100> was prepared as a substrate 11. The substrate 11 was provided with silicon dioxide protective layers 12 formed on both surfaces by thermal oxidation with an oxidizing gas. A predetermined position of the upper protective layer 12 was etched with an aqueous HF solution using a photoresist mask formed by a photolithographic process to expose a silicon square with a side of 8 μm. The protective layer 12 was resistant to the etching solution and protected the substrate 11 during the crystal-axis anisotropic etching process. After the photoresist mask was removed, the substrate 11 was subjected to crystal-axis anisotropic etching in an aqueous 27% potassium hydroxide solution at 80° C. to form an inverted pyramidal recess section 3 terminated by intersecting (111) crystal planes and a depth of 5.6 μm (FIG. 5A).

After the protective layers 12 were removed with an aqueous HF etching solution, a silicon dioxide film 15 with a thickness of 500 nm was formed on the substrate 11 using an oxidizing gas. A silicon dioxide sharp edge was formed on the recess section 13 of the substrate 11 (FIG. 5B). A PSG heat-flowable layer 14 with a thickness of 300 nm was formed thereon as in Embodiment 1 (FIG. 5C). The substrate was subjected to heat treatment at 1,100° C. for 20 minutes, as shown in FIG. 5D, so that the thickness of the heat-flowable layer 14 at the bottom of the recess section was larger than that of the other portion. The female mold substrate in accordance with the present invention was formed in such a manner.

Next, a microprobe tip was formed by forming a tip material layer on the female mold substrate, bonding it to another substrate and peeling it off the female mold substrate. This method for forming a microchip was disclosed in Japanese Patent Laid-Open No. 6-84455. The process will now be described in detail with reference to FIG. 6.

As shown in FIG. 6A, a platinum film with a thickness of 500 nm was formed on the entire surface of the substrate by a sputtering process. A photoresist layer with a cantilever pattern was formed thereon by a photolithographic process, the platinum film was patterned to form a microprobe tip layer 16 having a tip shape by an ion etching process using gaseous argon, and the photoresist layer was removed (FIG. 6A).

A silicon substrate was prepared, and a chromium layer of 50 Å and a gold layer of 1,000 Å were deposited thereon by a vacuum evaporation process, in that order. The thin films were patterned by a photolithographic process and an etching process using a wet Cr etchant and an Au etchant of iodine and potassium iodide to form a bonding layer 18, respectively (the process is not shown in the drawing).

As shown in FIG. 6B, the tip material layer 16 was bonded to the bonding layer 18 on the silicon substrate. The platinum layer as the tip material layer was bonded to the gold layer of the bonding layer by the pressure applied from the rear surfaces of the substrate 11 and the silicon substrate 17. The tip material layer was transferred onto the bonding layer 18 by peeling the PSG heat-flowable layer as a peeling layer off the tip material layer 16. A microprobe tip 20 was thereby formed as shown in FIG. 6C.

The point of the platinum microprobe tip 20 was observed by a scanning electron microscope (SEM). The tip had a replicated shape of the inverted pyramid of the substrate and a curvature radius of 300 nm. The tip was rounded and reflected the bottom shape of the recess section.

The point of the microprobe tips formed by the process shown in FIG. 6 without heat treatment and with heat treatment at 1,050° C. for 20 minutes were observed by the SEM for comparison. The tip had curvature radii of 100 nm and 200 nm, respectively. A microprobe tip with a larger radius can be produced using the female mold substrate in accordance with the present invention. Since, the process for forming the heat-flowable layer and treating it with heat in the method for making the female mold substrate in accordance with the present invention is based on the technology for producing semiconductor integrated circuits, the process has high reproducibility.

In the present invention as described above, a microprobe tip with a desired curvature radius can be formed using the same female mold substrate by changing the temperature for the heat treatment of the heat-flowable layer.

[Embodiment 3]

An example for forming a plurality of microprobe tips on the same substrate will now be described. Platinum microprobe tips were formed using the steps shown in FIGS. 5 and 6 as in Embodiment 2, except that the heat-flowable layer was composed of PSG and had a thickness of 50 nm with heat treatment at 1,100° C. for 20 minutes. The recess section of the substrate and the silicon dioxide film were formed as in Embodiment 2. One hundred bonding layers as a matrix of ten-by-ten were arranged on a silicon substrate, and one hundred recess sections were provided on the corresponding positions on the substrate. Microprobe tips were formed on the bonding layers. The pitch between the microprobe tips was 200 µm.

These microprobe tips were observed by a SEM. All the tips had a replicated shape of the inverted pyramid on the silicon substrate, and curvature radii were within a range of 50 nm±10 nm. The deviations of the height of the tip from the bonding layer were within a range ±100 nm. A plurality of microprobe tips having the substantially the same shape and size were made by the method for making the microprobe tip in accordance with the present invention.

[Embodiment 4]

An example for forming a microprobe tip having a high aspect ratio on the female mold substrate in accordance with the present invention will now be described. A silicon nitride microprobe tip was formed in accordance with the steps shown in FIGS. 4A–4E on the female mold substrate produced by the steps shown in FIGS. 5A–5D of Embodiment 3. The PSG heat-flowable layer had a thickness of 50 nm with heat treatment at 1,100° C. for 20 minutes. The resulting microprobe tip was observed by a SEM. The tip had a curvature radius of 50 nm and an aspect ratio of 0.6. For comparison, a microprobe tip was formed on a female substrate provided with no oxidation sharpening process and no heat-flowable layer. The curvature radius of the edge by SEM observation was 40 nm and the aspect ratio was 0.35.

A microprobe tip with a large curvature radius and a high aspect ratio can be produced using the female mold substrate in accordance with the present invention.

[Embodiment 5]

In this embodiment, the glass heat-flowable layer provided on the female mold substrate was formed by another film deposition process. The process will now be described with reference to FIGS. 5A–5D.

A polysiloxane was spin-coated onto the substrate having the sharp-edged recess section shown in FIG. 5B, and the formed sol film was heated at 300° C. A spin-on-glass (SOG) heat-flowable layer was formed (FIG. 5C). The heat-flowable layer was heated at 400° C. (FIG. 5D) so that the thickness of the heat-flowable layer at the recess bottom was larger than that at the other portion and the bottom edge was rounded. The female mold substrate in accordance with the present invention was thus prepared.

A platinum layer was formed on the female mold substrate as in Embodiment 2 and transferred onto a bonding layer formed on a silicon substrate. A platinum microprobe tip was thereby formed. The curvature radius of the microprobe tip by SEM observation was 30 nm.

The curvature radius of the microprobe tip can be changed significantly by the use of the SOG heat-flowable material layer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A female mold substrate used for production of a microprobe tip or probe detecting a tunneling current or weak force comprising:

a substrate provided with a recess section having a pyramidal shape; and a heat-flowable layer covering the recess section without filling in the recess section, said heat-flowable layer having an increased thickness at a base of the recess section to provide the microprobe tip or probe with an increased radius of curvature.

2. A female mold substrate according to claim 1, wherein said substrate comprises single-crystal silicon.

3. A female mold substrate according to claim 1, wherein said heat-flowable layer comprises glass.

4. A female mold substrate according to claim 3, wherein said glass is phosphosilicate glass.

5. A method for making a female mold substrate used for production of a microprobe tip or probe detecting a tunneling current or weak force comprising the steps of:

forming a recess section having pyramidal shape on the top surface of a substrate; and forming a heat-flowable layer on said top surface of said substrate including said recess section without filling in the recess section, said heat flowable layer having an increased thickness at a base of the recess section to provide the microprobe tip or probe with an increased radius of curvature.

6. A method for making a female mold substrate according to claim 5, wherein said substrate comprises single-crystal silicon and said recess section on the substrate is formed by crystal-axis anisotropic etching.

7. A method for making a female mold substrate according to claim 6, wherein a silicon dioxide film is formed by thermal oxidation on said substrate after forming said recess section.

8. A method for making a female mold substrate according to claim 5, further comprising a step for heating said heat-flowable layer formed on said substrate so that said heat-flowable layer flows.

9. A method for making a female mold substrate according to claim 5, wherein said heat-flowable layer is formed by a thermal chemical vapor deposition process.

10. A method for making a female mold substrate according to claim 5, wherein said heat-flowable layer comprises phosphosilicate glass.

11. A female mold substrate according to claim 1 produced by (a) providing a substrate having a recess section on the top surface of the substrate with a pyramidal shape;

(b) providing a heat-flowable layer on said top surface of said substrate including said recess section without filling in the recess section; and (c) heating the heat flowable layer to promote flow of the heat flowable layer and to provide an increased thickness at a base of the recess section.

* * * * *